(12) United States Patent
Lewin (10) Patent No.: US 11,957,976 B2
(45) Date of Patent: Apr. 16, 2024

(54) PREDICTING THE APPEARANCE OF DEFORMABLE OBJECTS IN VIDEO GAMES

(71) Applicant: Electronic Arts Inc., Redwood City, CA (US)

(72) Inventor: Christopher Lewin, London (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 309 days.

(21) Appl. No.: 17/146,689

(22) Filed: Jan. 12, 2021

(65) Prior Publication Data

US 2022/0176245 A1 Jun. 9, 2022

Related U.S. Application Data

(60) Provisional application No. 63/121,323, filed on Dec. 4, 2020.

(51) Int. Cl.
*A63F 13/52* (2014.01)
*G06N 3/08* (2023.01)
*G06T 13/40* (2011.01)
*G06T 15/04* (2011.01)
*G06T 17/20* (2006.01)

(52) U.S. Cl.
CPC .............. *A63F 13/52* (2014.09); *G06N 3/08* (2013.01); *G06T 13/40* (2013.01); *G06T 15/04* (2013.01); *G06T 17/20* (2013.01); *G06T 2210/16* (2013.01)

(58) Field of Classification Search
CPC ..... G06T 17/20; G06T 15/04; G06T 2210/16; G06T 2219/2021; A63F 13/52; A63F 13/69; A63F 13/812; A63F 2300/64; A63F 2300/646; A63F 2300/66; A63F 2300/6607; A63F 2300/8005; A63F 2300/8011
See application file for complete search history.

(56) References Cited

U.S. PATENT DOCUMENTS

| 11,158,121 | B1* | 10/2021 | Tung | G06N 3/045 |
| 11,347,905 | B1* | 5/2022 | Glassenberg | G06F 30/20 |
| 2021/0118239 | A1* | 4/2021 | Santesteban | G06Q 10/067 |

OTHER PUBLICATIONS

Holden, Daniel, et al., Subspace Neural Physics: Fast Data-Driven Interactive Simulation, In Proceedings of the 18th Annual ACM SIGGRAPH/Eurographics Symposium on Computer Animation, 12 pages, dated Jul. 26, 2019.

(Continued)

*Primary Examiner* — Lawrence S Galka
(74) *Attorney, Agent, or Firm* — Gray Ice Higdon (57) ABSTRACT

This specification describes a computer-implemented method of predicting the appearance of a deformable object in a video game. The method comprises determining a configuration of a moveable object underlying the deformable object. Input data is inputted into a machine-learning model. The input data comprises a representation of the configuration of the moveable object. A model output is generated as output of the machine-learning model for predicting the appearance of the deformable object. Mesh and texture data for the deformable object is determined from the model output. The deformable object is rendered using the generated mesh and texture data.

20 Claims, 9 Drawing Sheets

(56) References Cited

OTHER PUBLICATIONS

Kry, Paul G., et al., EigenSkin: Real Time Large Deformation Character Skinning in Hardware, SCA 02: Proceedings of the 2002 ACM SIGGRAPH/Eurographics symposium on Computer Animation, pp. 153-159, dated Jul. 2002.
Zhou, Yi, et al., On the Continuity of Rotation Representations in Neural Networks, arXiv:1812.07035v4, 13 pages, dated Jun. 8, 2020.
Muller, Matthias, et al., Position Based Dynamics, J. Vis. Commun. Image R., 18 109-118, 10 pages, dated 2007.

\* cited by examiner

PREDICTING THE APPEARANCE OF DEFORMABLE OBJECTS IN VIDEO GAMES

BACKGROUND

In video games, deformable objects (such as clothing) that interact with other objects may be animated using simulation methods. However, such methods can be computationally expensive which can present challenges for real-time rendering.

SUMMARY

In accordance with a first aspect, this specification describes a computer-implemented method of predicting the appearance of a deformable object in a video game using a machine learning model. The method includes determining a configuration of a moveable object underlying the deformable object. The machine learning model receives input data comprising a representation of the configuration of the moveable object and generates a model output for predicting the appearance of the deformable object. Mesh and texture data for the deformable object is determined from the model output. The deformable object is rendered using the generated mesh and texture data.

In accordance with a second aspect, this specification describes a computer-implemented method of training a machine-learning model for predicting the appearance of a deformable object in a video game. The method includes performing one or more simulations of the deformable object overlying a moveable object. The moveable object is in a particular configuration for each time step of a plurality of time steps of a simulation. For each simulation of the one or more simulations, one or more training examples are generated for the simulation. Each training example comprises, for a particular time step of the simulation: (i) a representation of the configuration for the moveable object, (ii) a code for mesh data for the deformable object, and (iii) a code for texture data for the deformable object. Parameters of the machine-learning model are updated. This comprises for each of one or more training examples: inputting, into the machine-learning model, input data for the training example. The input data comprises the representation of the configuration of the moveable object. A model output for predicting the appearance of the deformable object is generated as output of the machine-learning model. Parameters of the machine-learning model are updated based on a comparison of the model output for the training example with both: (i) the code for the mesh data, and (ii) the code for the texture data.

In accordance with a third aspect, this specification a non-transitory computer-readable medium containing instructions, which when executed by one or more processors, causes the one or more processors to perform a method comprising: determining a configuration of a moveable object underlying a deformable object in a video game; inputting, into a machine-learning model, input data comprising a representation of the configuration of the moveable object; generating, as output of the machine-learning model, a model output for predicting the appearance of the deformable object; determining, from the model output, mesh and texture data for the deformable object; and rendering the deformable object using the generated mesh and texture data.

DESCRIPTION

General Definitions

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "client", as used in some embodiments described herein, is a software application with which a user interacts, and which can be executed on a computing system or device locally, remotely, or over a cloud service.

A "server", as used in some embodiments described here, is a software application configured to provide certain services to a client, e.g. content and/or functionality.

A "video game", as used in some embodiments described herein, is a virtual interactive environment in which players engage. Video game environments may be facilitated through a client-server framework in which a client may connect with the server to access at least some of the content and functionality of the video game.

A "mesh", as used in some embodiments described herein, is a collection of vertices and/or edges that describes the shape of an object in a video game. A mesh may be a polygon mesh, such as a triangle mesh, wherein vertices are arranged in polygons to form the surface of the shape. A "mesh" may also refer to a mesh deformation that represents the transformation from a default/neutral configuration of the mesh.

A "texture map", as used in some embodiments described herein comprises texture data used to represent details of the appearance of an object which may be represented by a mesh. A texture map may be an image that is displayed (after any appropriate processing, such as pixel shading operations) on the surface of the object. A texture map may also be an image that represents a normal map that indicates the direction of a surface normal for points of the mesh. Normal maps may be used during shading/lighting calculations when rendering a video frame including the object in a video game. Texture maps may be stored as images.

Overview

Example implementations of the subject matter described in this specification provide systems and methods for predicting the appearance of deformable objects in video games (e.g. the creases, folds, contours and shape of clothing) using machine learning. The appearance of the deformable object may be predicted based on the configuration of an underlying movable object which may for example comprise the body of a game character having a plurality of different configurations, each configuration defining a different pose of the character.

In one example implementation, a machine-learning model receives input data comprising a representation of the configuration of a moveable object which underlies a deformable object. The machine learning model produces an output which can be used to predict the appearance of the deformable object. In particular, a polygon mesh and a normal map for the deformable object may be determined from the output of the machine learning model. The polygon mesh and normal map may be used to render the deformable object.

The appearance of the deformable object can be predicted for each of a plurality of configurations of the moveable object. Thus, methods and systems described herein enable deformable objects to be rendered in a realistic manner as the video game is being played (e.g. in real-time) while using less computational resources compared to other methods (such as physics simulation methods).

In an example implementation, the deformable object may be an item of clothing such as a sports jersey, and the moveable object may be a character of the video game. As the video game is being played, the video game may continually (e.g. periodically) determine parameters which define a physical configuration of the character. This may involve determining parameters for a skeletal frame for the character, for example rotational information of one or more joints of the skeleton. In this example, the input data to the machine-learning model comprises parameters defining the rotation of the one or more joints of the character skeletal frame. The machine-learning model may be a static model of the cloth motion, by which the dynamics of cloth are factored out. More generally, by factoring out dynamics, the machine-learning model may predict the appearance of the deformable object based on a physical configuration of the underlying movable object without requiring previous predictions generated by the machine-learning model.

The machine-learned model may comprise a model output for predicting the appearance of the deformable object. For example, the machine-learning model may output a vector, with a first portion of the vector corresponding to a compressed representation of a mesh of the deformable object, and a second portion of the vector corresponding to a predicted normal map for the deformable object.

The first portion of the vector may be coefficients used to reconstruct the mesh of the deformable object. For example, the coefficients may be associated with basis vectors which have been determined in advance using Principal Component Analysis (PCA) by analysing the results of simulations of the deformable object as the moveable object transitions into different configurations. In this example, the first portion of the vector may comprise PCA coefficients. The PCA coefficients thus together form a PCA code for the polygon mesh of the deformable object.

The second portion of the vector may comprise PCA coefficients which together form a PCA code for a normal map. This PCA code may be used to perform a nearest neighbour search on a normal map data store which comprises pre-defined normal maps which are determined in advance based on physics simulations of the deformable object.

The normal map data store may associate PCA codes with corresponding pre-defined normal maps. Each PCA code may be stored as a key in the database and may be determined based on its respective pre-defined normal map using principal component analysis techniques. The pre-defined normal maps may be stored in the normal map data store in a compressed form using a vector quantization technique.

The PCA code generated using the machine learning model may be compared to the PCA keys in the database to select a "nearest" PCA code key based on a nearest neighbour search (e.g. based on the smallest Euclidian distance between the PCA code and a PCA key). The pre-defined normal map associated with the selected key may then be used when rendering the deformable object.

The machine-learning model may generate an output vector for use in rendering a single frame of the video game. In some cases, the normal maps determined for the deformable object over a plurality of frames may be smoothed (e.g. using temporal filtering or interpolation) in order to minimize artifacts appearing in the texture of the deformable object as a result of selecting different normal maps at different frames.

The machine-learning model comprises parameters that are learned as a result of a training process. The machine-learning model may comprise a neural network having one or more hidden layers. For example, the machine-learning model may be a multi-layer perceptron model.

The training process uses training data derived from performing simulations in which the deformable object interacts with the moveable object. For example, the simulations may involve initializing the moveable object in an initial pose (such as a T-pose for a character skeleton), and transitioning the moveable object into different configurations/poses. The deformable object overlying the moveable object may be simulated to deform as the moveable object transitions into different poses. In the simulation, a high-resolution mesh (e.g. high polygon count) of the deformable object may be used, which may be converted into a low-resolution mesh in addition to a corresponding normal map for the low-resolution mesh. The training data for training the machine learning model may comprise (i) parameters defining a particular configuration of the moveable object (ii) PCA coefficients forming a PCA code for the corresponding low-resolution mesh and (iii) PCA coefficients forming a PCA code for the corresponding normal map.

The training data may comprise training examples that are sufficiently different to each other, thus reducing the size of normal map data stores used by the video game. For example, the different configurations of the moveable object may be hashed such that each training example defines a unique configuration of the moveable object.

The machine-learning model is trained based on an objective function, wherein the objective function depends on a comparison between predicted the predicted compressed representations and the ground-truth compressed representations. For example, the objective function may comprise an absolute distance objective function, i.e. an L1 norm.

Figure 1:
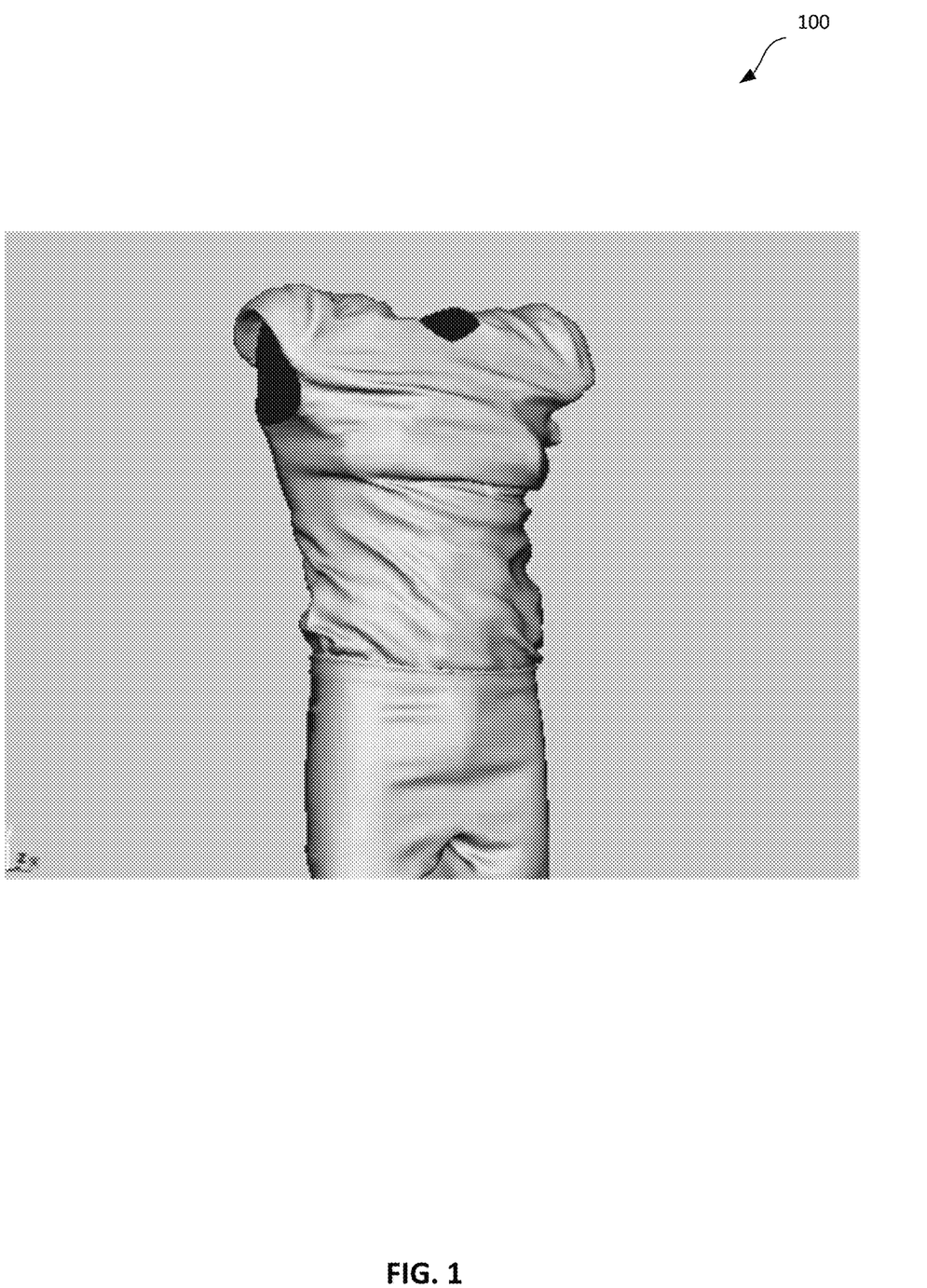
FIG. 1 shows an example of clothing in a video game produced by a simulation method.

FIG. 1 shows an example 100 of clothing in a video game produced by a simulation method. The example displayed in FIG. 1 may be used to determine training data for training of machine-learning models disclosed herein.

Figure 2:
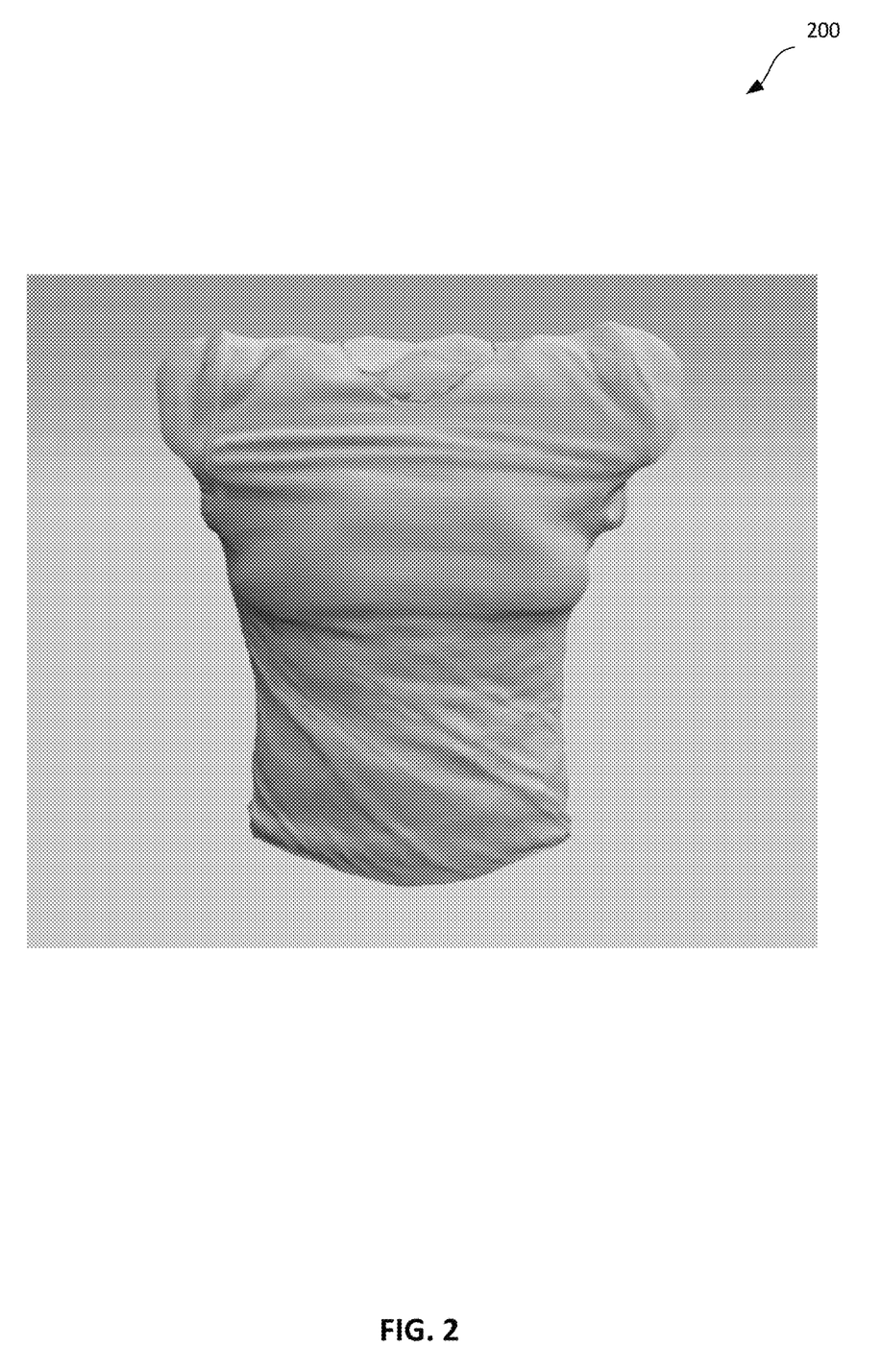
FIG. 2 shows an example of clothing in a video game produced using a trained machine-learning model.

FIG. 2 shows an example 200 of clothing in a video game produced using a trained machine-learning model. The example displayed in FIG. 2 shows a mesh for the clothing and a corresponding normal map depicted by the shading of the mesh.

As shown in FIGS. 1 and 2, the techniques described in this specification can be used to predict the appearance of clothing, including tight-fitting clothing such as sports clothing. However, more generally, the techniques may be applied to any stateless deformer. The appearance of any deformable object may be predicted, for example the muscle or skin of a character.

Example Video Game Environment

Figure 3:
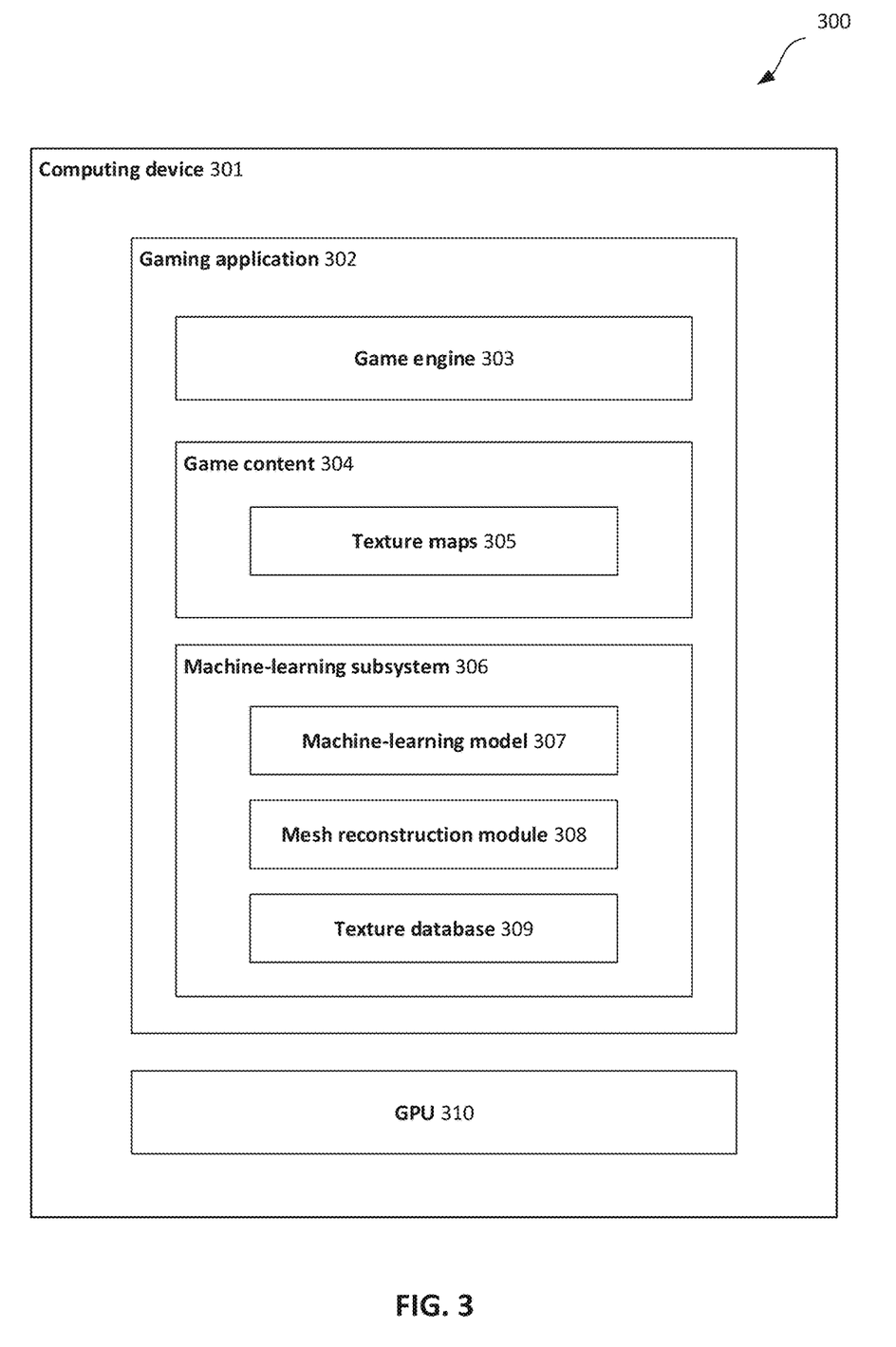
FIG. 3 is a schematic block diagram illustrating an example of a computer system configured to provide a video game environment to players of a video game.

FIG. 3 illustrates an example of a computer system configured to provide a video game environment 300 to players of a video game. The video game environment 300 is configured to predict the appearance of one or more deformable objects (e.g. clothing/fabric) that overlies a moveable object (e.g. an entity/character of the video game) using a trained machine-learning model 307, and render the one or more deformable objects in accordance with the predicted appearance while the video game is being played.

The video game environment 300 includes one or more client computing devices 301. Each client computing device 301 is operable by a user and provides a client in the form of gaming application 302 to the user. The client computing device 301 may be configured to communicate with a video game server apparatus including a game server for providing content and functionality to the gaming application 302. Any of the functionality described as being performed by a specific device may instead be performed across a number of computing devices, and/or functionality described as being performed by multiple devices may be performed on a single device.

The client computing device 301 can be any computing device suitable for providing the gaming application 302 to the user. For example, the client computing device 301 may be any of a laptop computer, a desktop computer, a tablet computer, a video games console, or a smartphone. For displaying the graphical user interfaces of computer programs to the user, the client computing device includes or is connected to a display (not shown). Input device(s) (not shown) are also included or connected to the client. Examples of suitable input devices include keyboards, touchscreens, mice, video game controllers, microphones and cameras. Client computing device 301 includes a Graphics Processing Unit (GPU) 310 which may be used for rendering of objects in the video game.

Gaming application 302 includes a game engine 303. The game engine 303 can be configured to execute aspects of the operation of the gaming application 302 according to game rules. Examples of game rules can include rules for scoring, possible inputs, actions/events, movement in response to inputs, and the like. The game engine 303 may receive user inputs and determine in-game events, such as actions, jumps, runs, throws, attacks, and other events appropriate for the gaming application 302. During runtime operation, the game engine 303 can read user inputs, in-game data, and game state information to determine the appropriate in-game events.

Furthermore, the game engine 303 is configured to determine the state of the video game as it is being played. This involves determining the state of objects in the video game, such as the configuration of a moveable object. For example, the moveable object may comprise one or more rotatable joints and the configuration of the moveable object may comprise rotational information for the one or joints of the moveable object. The moveable object may comprise a skeletal frame of an entity in the video game.

The video game engine may determine the configuration of the moveable object continually (e.g. periodically, such as before the rendering of each video frame including the moveable object) and provide a representation of this configuration to machine-learning subsystem 306. In some cases, the game engine 303 may determine in advance that the moveable object will be in a particular configuration. In these cases, the game engine 303 may provide the predetermined configuration to machine-learning subsystem 306. For example, a model output generated by machine-learning model 307 may be stored for later use in rendering a deformable object overlying the moveable object.

The gaming application 302 comprises game content 304 accessed while the video game is being played by the player. The game content includes texture maps 305 and other assets (not displayed) such as markup-language files, scripts, images and music. Texture maps 305 may be stored in a compressed format, such as a texture block compression format or conventional image compression formats such as JPEG or JPEG-2000. Texture maps 305 that are stored as part of game content 304 may be used in combination with texture maps produced by machine-learning subsystem 306. For example, texture maps for background objects or static objects may be stored as part of texture maps 305, whereas texture maps for deformable objects (e.g. clothing) may be determined by machine-learning subsystem 306.

Gaming application 302 includes a machine-learning subsystem 306 that is used to predict the appearance of deformable objects overlying moveable objects. Machine-learning subsystem 306 comprises machine-learning model 307, mesh reconstruction module 308, and texture database 309. Machine-learning model 307 receives a representation of the configuration of the moveable object and processes this representation to generate one or more model outputs. Model outputs (or portions thereof) are provided to mesh reconstruction module 308 which generates a mesh for the deformable object. Model outputs (or portions thereof) are processed by the machine-learning subsystem 306 when generating a texture map (e.g. a normal map) for the deformable object by performing a comparison with entries of the texture database 309. The operations of machine-learning subsystem 306 will be described in greater detail in relation to FIG. 4.

The machine-learning model 307 may be configured for use in rendering a particular type of deformable object. For example, a machine-learning model may have been trained to predict the appearance of a particular item of clothing (e.g. a sports jersey), and another machine-learning model may have been trained to predict the appearance of another item of clothing (e.g. shorts). In this example, the mesh of the jersey (or a transformation thereof) may be shared between different sports players, but may have differing texture maps in some cases (e.g. for players in different teams). The game engine 303 may determine the configuration of the skeletal frames (e.g. rotational information for one or more joints) for all the players that share the same jersey type, and provide these configurations as a batch to the machine-learning model 307. The machine-learning model 307 may output a model output representing the predicted appearance of the jersey for each of the players. In this way, the machine-learning model 307 may be used to simultaneously predict the appearance of multiple instances of the same/similar object.

In general, trained machine-learning models comprise parameters that have been learned after training the machine-learning model on one or more tasks using training data. Example methods of training the machine-learning model disclosed above are described in relation to FIGS. 5, 6 and 8.

The processing performed by components of machine-learning subsystem 306 may be performed by different processors. As an example, the operations of the machine-learning model 307 may be performed by a central processing unit (CPU) of the computing device 301 (not displayed), whereas the operations of the mesh reconstruction module 308 and the processing of texture database 309 may be performed by the GPU 310.

As depicted in FIG. 3, the machine-learning subsystem 306 are shown as components that are local to computing device 301. This may be advantageous for reducing latency, as model outputs of the machine-learning model 307 that are generated as the video game is being played may not need to be transmitted to computing device 301 over a network. However, it will be appreciated that other implementations are possible, such as the machine-learning subsystem 306 (or components thereof) being implemented on a separate computing device (e.g. a video game server) to computing device 301.

Example Inference Method

Figure 4:
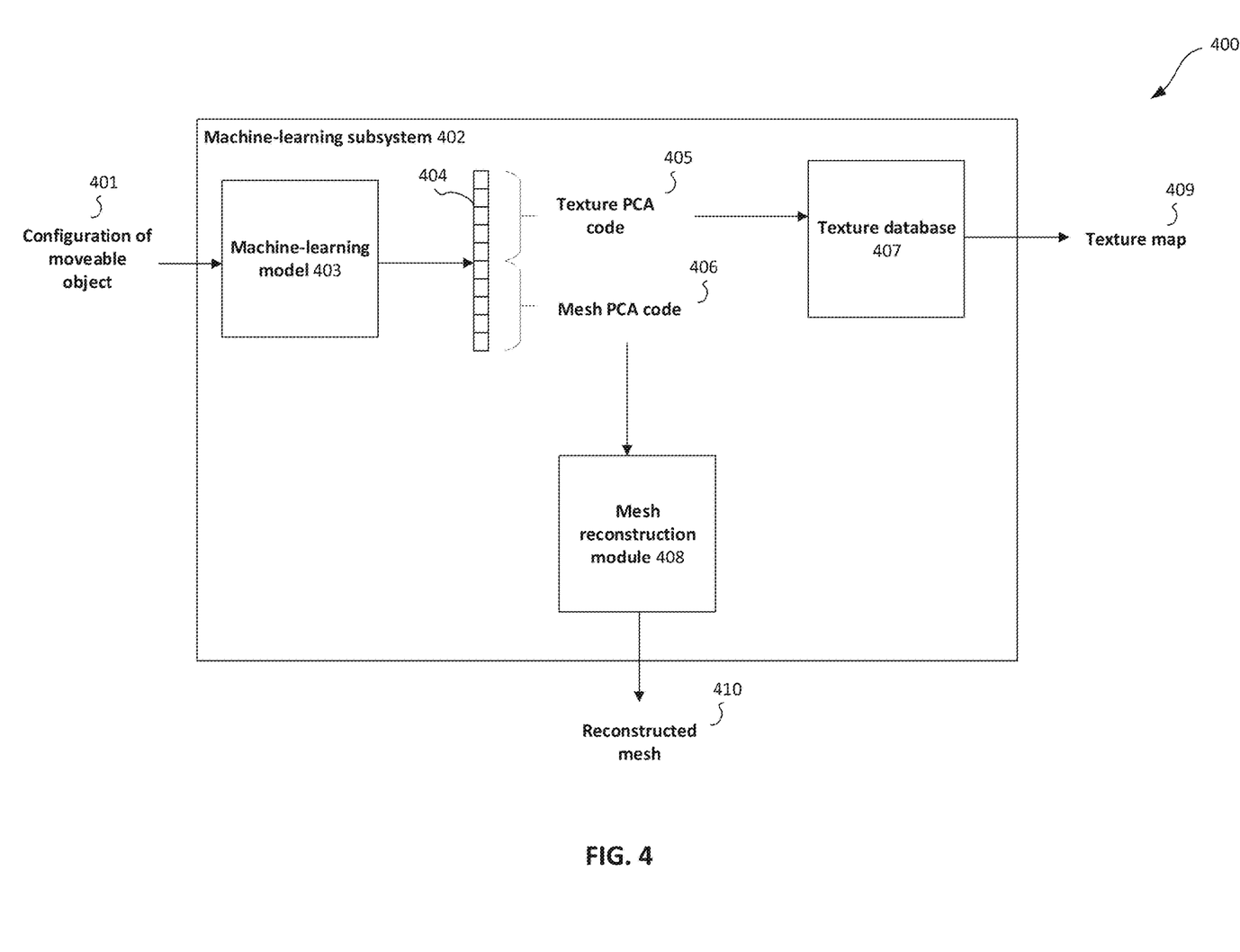
FIG. 4 illustrates an example method for predicting the appearance of a deformable object in a video game using a trained machine-learning model.

FIG. 4 illustrates an example method 400 for predicting the appearance of a deformable object in a video game using a trained machine-learning model 403. As described previously, the deformable object overlies a moveable object that is in a certain configuration. The method 400 is performed as the video game is being played.

A representation 401 of the configuration of the moveable object is provided to machine-learning model 403 of machine-learning subsystem 402. The representation 401 is any information defining or relating to the configuration/state of the moveable object. For example, the moveable object may comprise one or more rotatable joints and the representation of the configuration of the moveable object 401 may comprise rotational information for one or more of these joints. Rotational information for a joint may be represented by a set of three-dimensional vectors, e.g. two vectors that are each three-dimensional. Vectors representing the rotational configuration of various joints of the moveable object may be concatenated to form an input vector which represents the overall configuration/state of the moveable object.

The machine-learning model 403 processes the representation 401 of the moveable object and generates a model output 404. The machine-learning model 403 may use any suitable machine-learning techniques, such as linear regression, random forests, neural networks, etc. In the case of the machine-learning model 403 comprising a neural network, the neural network may be a multi-layer perceptron that comprises fully-connected layers. In a neural network comprising one or more fully-connected layers, each fully connected layer receives an input and applies a learned linear transformation to its input. The fully connected layer may further apply a non-linear transformation to generate an output for the layer.

For illustration purposes, FIG. 4 shows the machine-learning model 403 outputting a single model output 404 for a single configuration of a moveable object 401. However, it will be appreciated that a plurality of configurations 401 may be input to the machine-learning model 403, and a model output 404 may be generated for each of these configurations 401.

The model output 404 comprises a vector that includes a first portion and a second portion. The first portion corresponds to a texture Principal Components Analysis (PCA) code 405, and a second portion corresponds to a mesh PCA code 406.

Generally, a PCA code provides a compressed representation of a higher-dimensional vector. For example, each point in a set of N points in a D-dimensional space may be represented by a K-dimensional space after performing PCA on the set of N D-dimensional points, where K is less than D. In particular, from performing PCA, a set of K basis vectors are determined. A point of the D-dimensional space may be represented as a linear combination of the K basis vectors, wherein the coefficients of the linear combination form a K-dimensional PCA code for the point.

The texture PCA code 405 is processed by the machine-learning subsystem 402 by comparing the texture PCA code 405 with PCA codes of the texture database 407. Texture database 407 comprises a set of associations between a texture PCA code and a corresponding texture map for the PCA code. Texture database 407 comprises pre-defined texture maps for the deformable object that have been obtained from performing simulations of the deformable object, as will be described in further detail in relation to FIG. 5.

Each PCA code may be stored as a key in the texture database 407 and may be determined based on its respective pre-defined texture map using principal component analysis techniques. The pre-defined texture maps may be stored in the texture database 407 in a compressed form, e.g. using a vector quantization technique.

The texture PCA code 405 generated using the machine-learning model 403 may be compared to the PCA keys in the texture database 407 to select a "nearest" PCA code key based on a nearest neighbour search (e.g. based on the smallest Euclidian distance between the PCA code and a PCA key). The pre-defined texture map 409 associated with the selected key may then be used when rendering the deformable object.

The mesh PCA code 406 is received by mesh reconstruction module 408 which processes the mesh PCA code 406 and outputs a reconstructed mesh 410 for use in rendering the deformable object. Mesh reconstruction module 408 receives stored mesh basis vectors and reconstructs the mesh for the deformable object. For example, the mesh reconstruction module 408 may perform a linear combination of the stored mesh basis vectors. The mesh PCA code 406 may represent coefficients of the linear combination.

Example Training Data Generation Method

Figure 5:
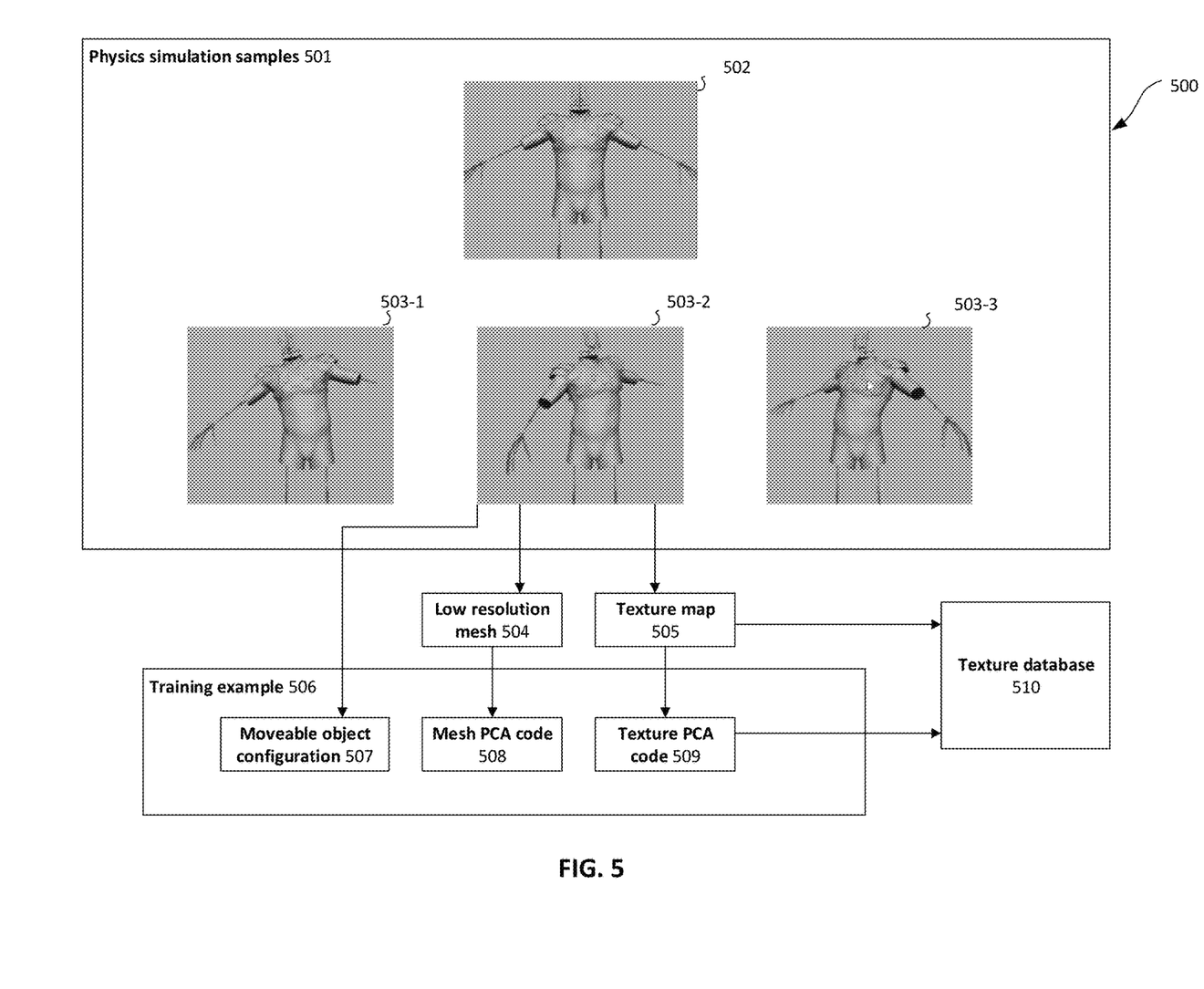
FIG. 5 illustrates an example method for generating training examples for training a machine-learning model for use in predicting the appearance of a deformable object in a video game.

FIG. 5 illustrates an example method 500 for generating training examples for training a machine-learning model for use in predicting the appearance of a deformable object in a video game. In particular, FIG. 5 shows generating training examples 506 for training machine-learning models described herein using data obtained from performing physics simulations of the deformable object interacting with the moveable object.

The physics simulations involve arranging the moveable object in different configurations and simulating the animation of the overlying (relative to the moveable object) deformable object, and collecting a set of samples 501 from the simulations. The samples displayed in FIG. 5 display a skeletal frame as a moveable object. Sample 502 shows a neutral configuration/pose for the skeletal frame, and samples 503-1, 503-2, 503-3 each show examples of alternative configurations/poses to which the skeletal frame may transition in the video game. Each simulation may begin with the skeletal frame in the neutral configuration, and end in the configurations shown by samples 503. In this way, the deformable object overlying the skeletal frame may deform in a consistent manner.

Typically, the simulations are performed using "high-resolution" meshes, which comprise a large number of polygons. Texture baking techniques may be used on the high-resolution mesh of the deformable object for a sample 503-2 to provide a low-resolution mesh 504 of the deformable object, and a texture map 505 for the deformable object. The texture map 505 may comprise a normal map.

The low-resolution meshes 504 for each of the samples in the set 501 are collected in order to perform PCA. A set of mesh basis vectors are determined from performing PCA on the collection of low-resolution meshes 504, which are stored for use in mesh reconstruction when rendering the deformable object while the video game is being played. For each low-resolution mesh, a mesh PCA code 508 is determined.

Similarly, the texture maps 505 for each of the samples in the set 501 are collected in order to perform PCA. A set of texture basis vectors are determined, and a texture PCA code 509 is determined for each sample in the set 501. Texture map 505 and corresponding texture PCA code 509 is stored in texture database 510 which database is used when rendering the deformable object while the video game is being played. The texture database 510 may comprise texture maps 505 determined from sufficiently different configurations of the underlying moveable object. For example, different configurations of the moveable object may be compared by a distance metric (e.g. absolute distance). The texture maps 505 of the texture database 510 may be such that the associated configurations of the moveable object are farther apart than a lower threshold. The texture maps 505 may be stored in texture database 510 in a compressed format, e.g. using techniques such as vector quantization.

Example Training Method

A training example 506 is generated from sample 503-2 comprising: (i) a representation of the configuration of the moveable object 507, (ii) the mesh PCA code 508 for the deformable object, and (iii) the texture PCA code 509 for the deformable object. A plurality of training examples generated by the method 500 may be used to train the machine-learning models described herein.

Figure 6:
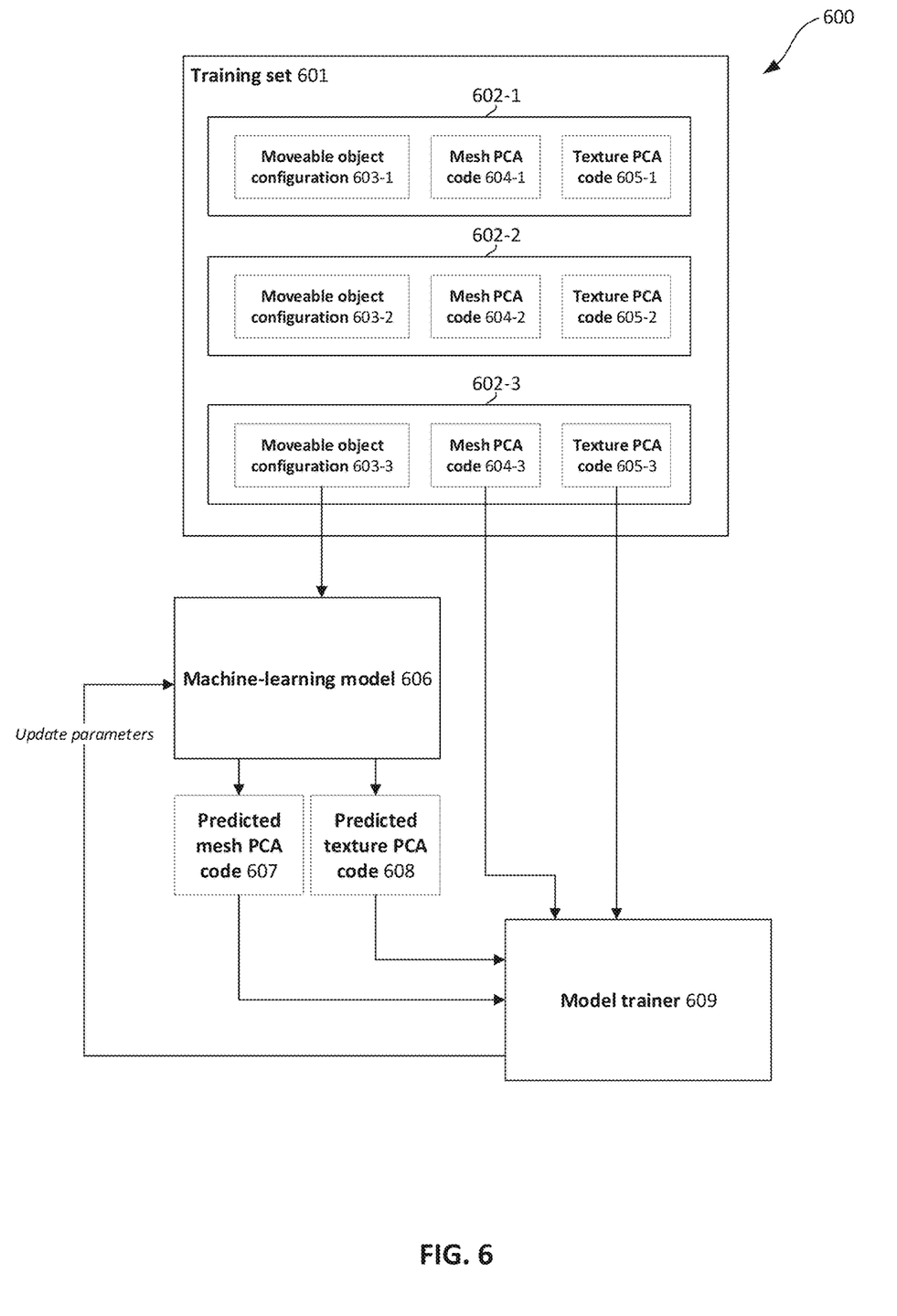
FIG. 6 illustrates an example method for training a machine-learning model for use in predicting the appearance of a deformable object in a video game.

FIG. 6 illustrates an example method 600 for training a machine-learning model 606 for use in predicting the appearance of a deformable object in a video game. The training examples 602-1, 602-2, 602-3 of training set 601 may be determined using methods described in relation to FIG. 5, or by any other appropriate method.

FIG. 6 depicts three training examples 602-1, 602-2, 602-3, however it will be appreciated that the training set 601 can comprise any appropriate number of training examples 602. Each training example 602 comprises: (i) a representation of a configuration of a moveable object 603-1, 603-2, 603-2, (ii) a mesh PCA code 604-1, 604-2, 604-3, and (iii) a texture PCA code 605-1, 605-2, 605-3.

During training, the goal for the machine-learning model 606 is to learn a mapping between configurations of the moveable object to the PCA codes 604, 605. FIG. 6 displays the processing of a single training example 602-3. The machine-learning model 606 processes the representation of the moveable object configuration 603-3 in accordance with a current set of parameters, and generates a model output. From the model output, a predicted mesh PCA code 607 and a predicted texture PCA code 608 for training example 602-3 are determined.

Model trainer 609 receives the "ground-truth" mesh PCA code 604-3, "ground-truth" texture PCA code 605-3, predicted mesh PCA code 607, and predicted texture PCA code 608, and updates parameters of the machine-learning model 606 in order to optimize an objective function. The objective function comprises a loss that is in dependence on: (i) a comparison between the "ground-truth" mesh PCA code 605-3 and the predicted mesh PCA code 607, and (ii) a comparison between the "ground-truth" texture PCA code 605-3 and the predicted texture PCA code 608. For example, the loss may measure an absolute error between ground-truth PCA codes and predicted PCA codes. Alternatively, the loss may measure a mean-squared error, or any other suitable error/loss function.

The parameters of the machine-learning model 606 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

The training process is repeated for a number of training examples, and is terminated at a suitable point in time, e.g. when predicted PCA codes closely match ground-truth PCA codes. The trained machine-learning model 606 can be used for accurately predicting the appearance of the deformable object for different configurations/poses of the underlying moveable object in an efficient manner while the video game is being played.

Figure 7:
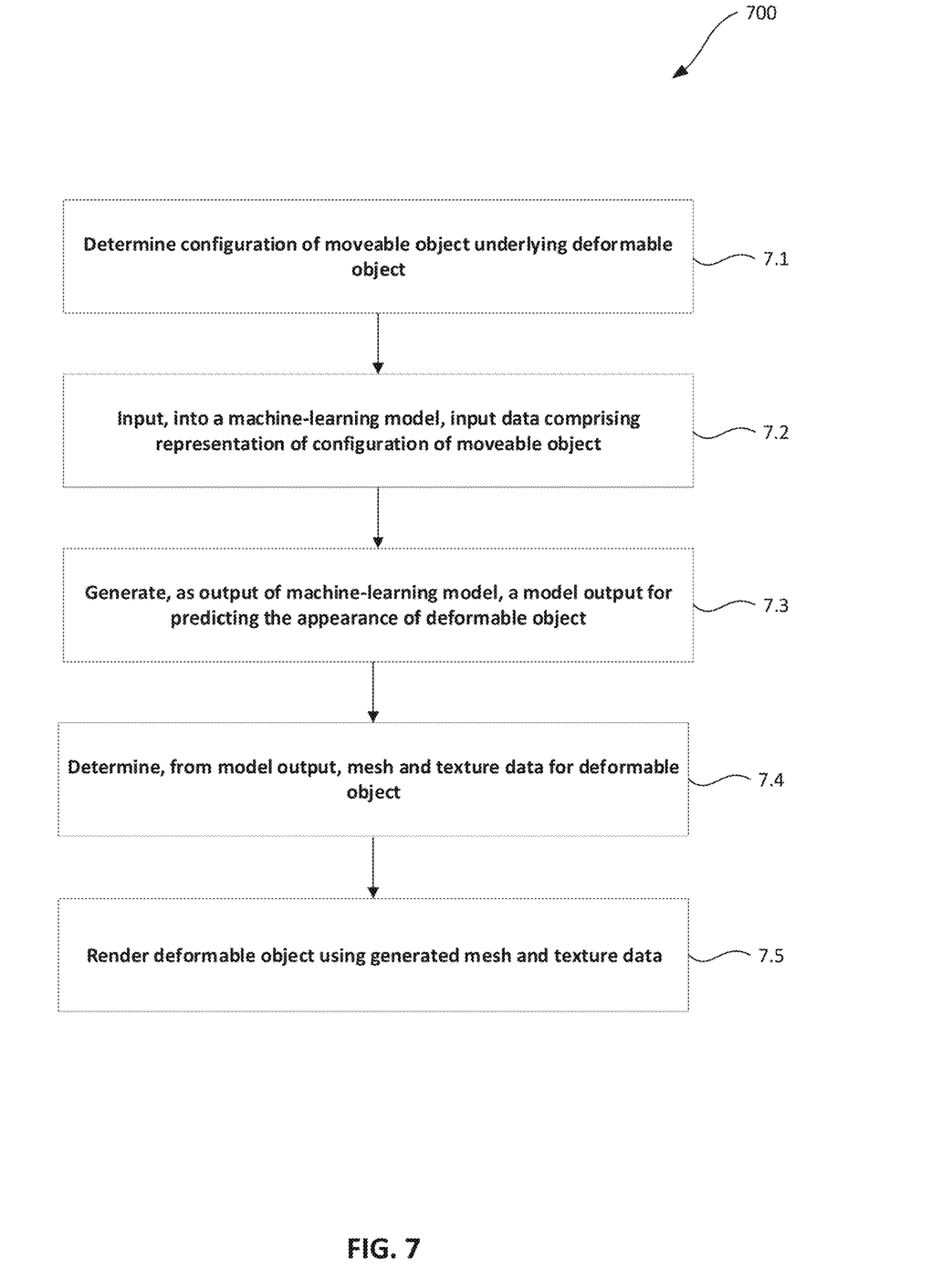
FIG. 7 is a flow diagram illustrating an example method of predicting the appearance of a deformable object in a video game.

FIG. 7 is a flow diagram illustrating an example method 700 of predicting the appearance of a deformable object in a video game. FIG. 7 displays a general overview of the methods described in relation to FIGS. 3 and 4.

In step 7.1, a configuration of a moveable object underlying a deformable object is determined. The moveable object may comprise one or more rotatable joints. The configuration of the moveable object may comprise rotational information for the one or joints of the moveable object. The deformable object may be a fabric that overlies the moveable object.

In step 7.2, input data comprising a representation of the configuration of the moveable object is inputted into a machine-learning model. The machine-learning model may comprise a neural network.

In step 7.3, a model output for predicting the appearance of the deformable object is generated as output of the machine-learning model.

In step 7.4, mesh and texture data for the deformable object is determined from the model output. Determining texture data for the deformable object may comprise determining a normal map for the deformable object. The model output may comprise a code for a predicted normal map. Determining a normal map for the deformable object may comprise performing a nearest-neighbour search on a normal map data store based on the code, and selecting a normal map for the deformable object based on the result of the nearest neighbour search.

The model output may comprise a code for a predicted mesh for the deformable object. Determining mesh data for the deformable object may comprise generating a mesh by combining stored mesh basis vectors with the code for the predicted mesh.

In step 7.5, the deformable object is rendered using the generated mesh and texture data.

Figure 8:
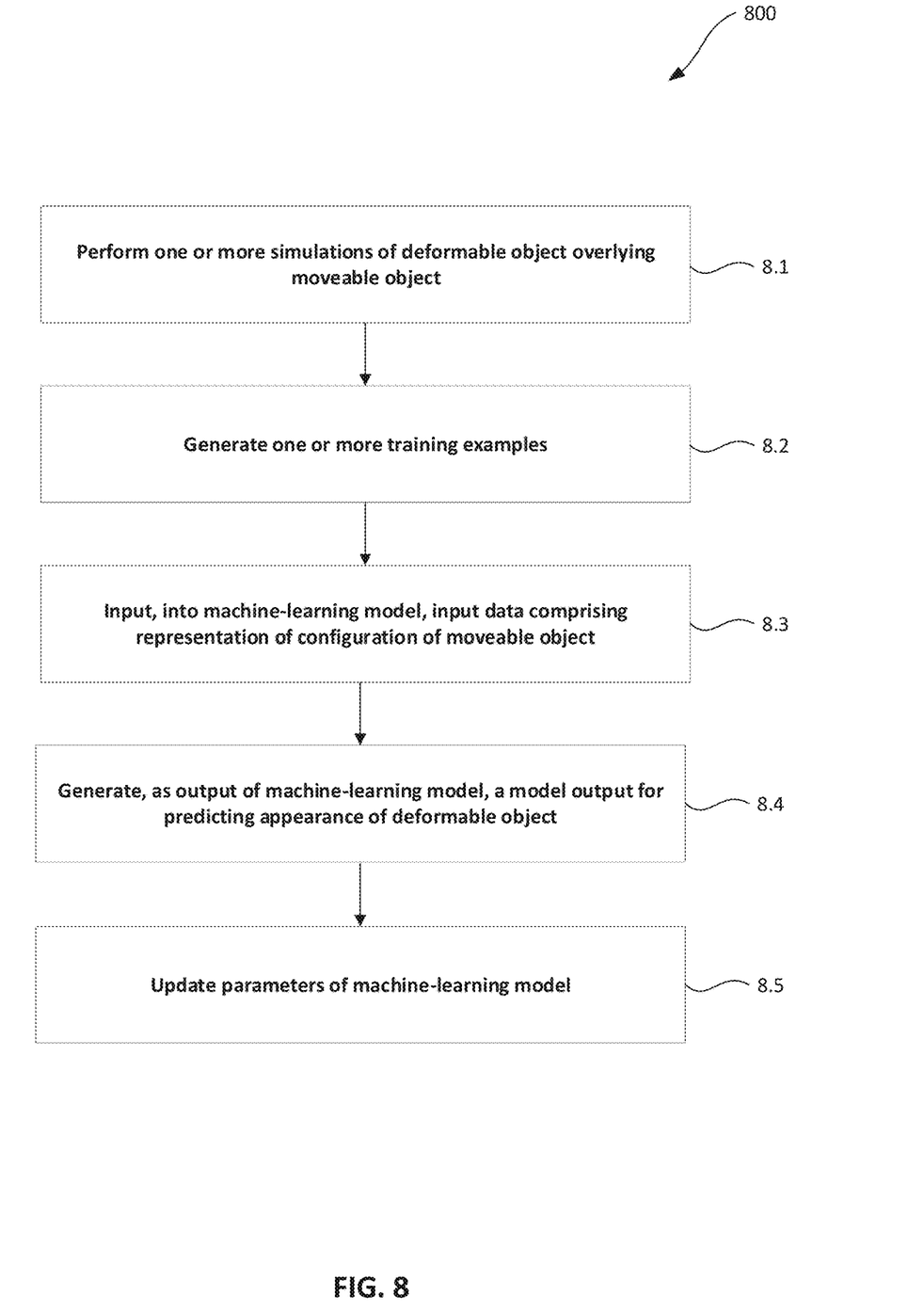
FIG. 8 is a flow diagram illustrating an example method of training a machine-learning model for predicting the appearance of a deformable object in a video game.

FIG. 8 is a flow diagram illustrating an example method 800 of training a machine-learning model for use in predicting the appearance of a deformable object in a video game. FIG. 8 displays a general overview of methods described in relation to FIGS. 5 and 6.

In step 8.1, one or more simulations of the deformable object overlying a moveable object are performed. The moveable object is in a particular configuration for each time step of a plurality of time steps of a simulation. Each simulation of the one or more simulations may simulate a different trajectory of the moveable object starting from an initial configuration. The initial configuration may be the same for each of the one or more simulations.

In step 8.2, one or more training examples are generated. One or more training examples are generated from each of the one or more simulations. Each training example comprises, for a particular time step of the simulation: (i) a representation of the configuration for the moveable object, (ii) a code for mesh data for the deformable object, and (iii) a code for texture data for the deformable object.

Generating one or more training examples may comprise determining mesh basis vectors for mesh data obtained from the one or more simulations. The generating may comprise determining texture basis vectors for texture data obtained from the one or more simulations. Generating a training example for a time step of a simulation may comprise determining a code for mesh data of the time step. The code may be used in combination with the determined mesh basis vectors to reconstruct the mesh data for the time step. One or more mesh basis vectors may be stored for use in reconstructing meshes for the deformable object in the video game. A code for texture data for the time step may be determined. Basis vectors and codes may be determined from performing Principal Components Analysis (PCA) on the mesh and texture data obtained from the one or more simulations.

In step 8.3, input data for a training example is inputted into a machine-learning model. The input data comprises the representation of the configuration of the moveable object for the training example.

In step 8.4, a model output for predicting the appearance of the deformable object is generated as output of the machine-learning model.

In step 8.5, parameters of the machine-learning model are updated. The parameters are updated based on a comparison of the model output for the training example with both: (i) the code for the mesh data, and (ii) the code for the texture data. Step 8.5 may involve updating parameters of the machine-learning model using a plurality of training examples processed according to steps 8.3 and 8.4.

Method 800 may further comprise generating a texture data store that associates texture data for a time step of a simulation with a corresponding code for the texture data. The texture data of the texture data store may be stored in a compressed representation.

Figure 9:
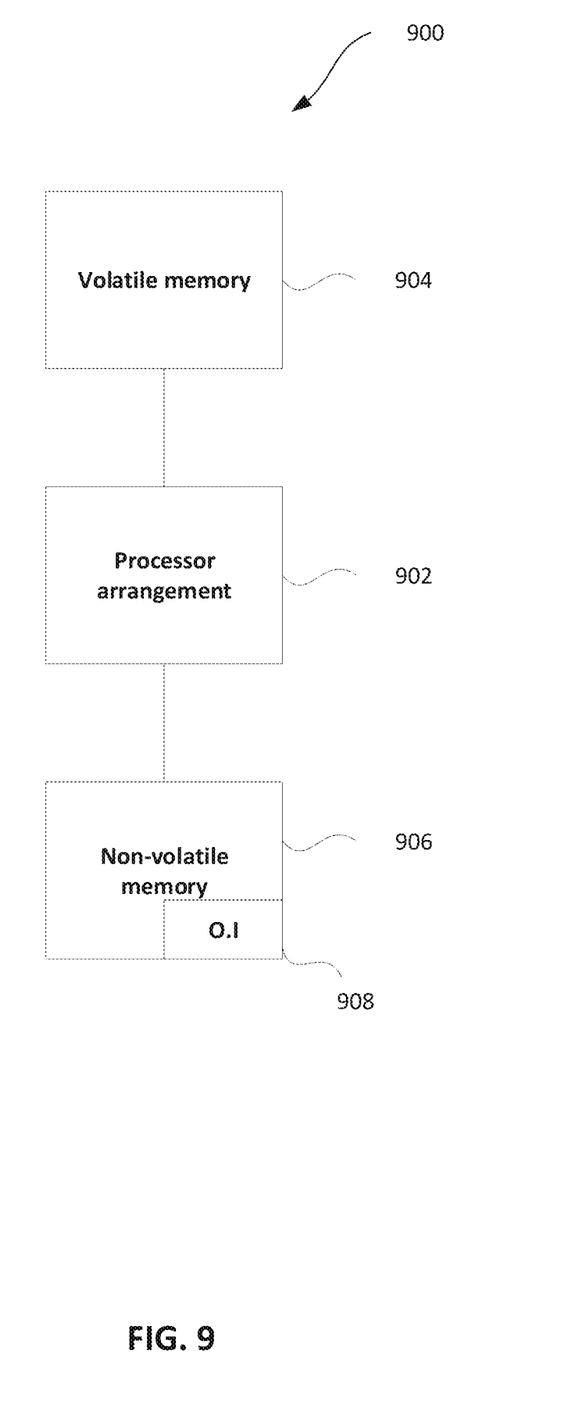
FIG. 9 shows a schematic example of a system/apparatus for performing any of the methods described herein.

FIG. 9 shows a schematic example of a system/apparatus for performing methods described herein. The system/apparatus shown is an example of a computing device. It will be appreciated by the skilled person that other types of computing devices/systems may alternatively be used to implement the methods described herein, such as a distributed computing system.

The apparatus (or system) 900 comprises one or more processors 902. The one or more processors control operation of other components of the system/apparatus 900. The one or more processors 902 may, for example, comprise a general purpose processor. The one or more processors 902 may be a single core device or a multiple core device. The one or more processors 902 may comprise a central processing unit (CPU) or a graphical processing unit (GPU). Alternatively, the one or more processors 902 may comprise specialised processing hardware, for instance a RISC processor or programmable hardware with embedded firmware. Multiple processors may be included.

The system/apparatus comprises a working or volatile memory 904. The one or more processors may access the volatile memory 904 in order to process data and may control the storage of data in memory. The volatile memory 904 may comprise RAM of any type, for example Static RAM (SRAM), Dynamic RAM (DRAM), or it may comprise Flash memory, such as an SD-Card.

The system/apparatus comprises a non-volatile memory 906. The non-volatile memory 906 stores a set of operation instructions 908 for controlling the operation of the processors 902 in the form of computer readable instructions. The non-volatile memory 906 may be a memory of any kind such as a Read Only Memory (ROM), a Flash memory or a magnetic drive memory.

The one or more processors 902 are configured to execute operating instructions 908 to cause the system/apparatus to perform any of the methods described herein. The operating instructions 908 may comprise code (i.e. drivers) relating to the hardware components of the system/apparatus 900, as well as code relating to the basic operation of the system/apparatus 900. Generally speaking, the one or more processors 902 execute one or more instructions of the operating instructions 908, which are stored permanently or semi-permanently in the non-volatile memory 906, using the volatile memory 904 to temporarily store data generated during execution of said operating instructions 908.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 9, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method of predicting an appearance of a deformable object in a video game, comprising:
   determining a configuration of a moveable object underlying the deformable object;

inputting, into a machine-learning model, input data comprising a representation of the configuration of the moveable object;

generating, as output of the machine-learning model, a model output including both a code for mesh data and a code for texture data for predicting the appearance of the deformable object;

determining, from the model output including both the code for the mesh data and the code for the texture data, the mesh and texture data for the deformable object; and rendering the deformable object using the generated mesh and texture data.

2. The method of claim 1, wherein determining the texture data for the deformable object comprises determining a normal map for the deformable object.

3. The method of claim 2 wherein the code for the texture data included in the model output corresponds to a code for a predicted normal map, wherein determining the normal map for the deformable object comprises performing a nearest-neighbour search on a normal map data store based on the code for the predicted normal map, and selecting the normal map for the deformable object based on a result of the nearest-neighbour search.

4. The method of claim 1, wherein the code for the mesh data included in the model output corresponds to a code for a predicted mesh for the deformable object.

5. The method of claim 4, wherein determining the mesh data for the deformable object comprises generating a mesh by combining stored mesh basis vectors with the code for the predicted mesh.

6. The method of claim 1, wherein:
the moveable object comprises one or more rotatable joints;
the configuration of the moveable object comprises rotational information for the one or joints of the moveable object; and
the deformable object is a fabric that overlies the moveable object.

7. The method of claim 1, wherein the machine-learning model comprises a neural network.

8. A computer-implemented method of training a machine-learning model for predicting an appearance of a deformable object in a video game, the method comprising:
performing one or more simulations of the deformable object overlying a moveable object, wherein the moveable object is in a particular configuration for each time step of a plurality of time steps of a simulation;
for each simulation of the one or more simulations:
generating one or more training examples for the simulation, wherein each training example comprises, for a particular time step of the simulation: (i) a representation of a configuration for the moveable object, (ii) a code for mesh data for the deformable object, and (iii) a code for texture data for the deformable object; and
updating parameters of the machine-learning model, comprising for each of one or more training examples:
inputting, into the machine-learning model, input data for the training example, the input data comprising the representation of the configuration of the moveable object;
generating, as output of the machine-learning model, a model output including both a code for a predicted normal map and a code for a predicted mesh for predicting the appearance of the deformable object; and
updating parameters of the machine-learning model based on a comparison of the model output for the training example with both: (i) the code for the mesh data, and (ii) the code for the texture data.

9. The method of claim 8, wherein each simulation of the one or more simulations simulates a different trajectory of the moveable object starting from an initial configuration, wherein the initial configuration is the same for each of the one or more simulations.

10. The method of claim 8, wherein generating the one or more training examples comprises:
determining mesh basis vectors for mesh data obtained from the one or more simulations;
determining texture basis vectors for texture data obtained from the one or more simulations; and
generating a training example for a time step of a simulation comprising:
determining a code for mesh data of the time step, wherein the code can be used in combination with the determined mesh basis vectors to reconstruct the mesh data for the time step; and
determining a code for texture data of the time step.

11. The method of claim 10, wherein the basis vectors and codes are determined from performing Principal Components Analysis (PCA) on the mesh and texture data obtained from the one or more simulations.

12. The method of claim 10, further comprising storing one or more mesh basis vectors for use in reconstructing meshes for the deformable object in the video game.

13. The method of claim 8, further comprising:
generating a texture data store that associates texture data for a time step of a simulation with a corresponding code for the texture data.

14. The method of claim 13, wherein the texture data of the texture data store are stored in a compressed representation.

15. The method of claim 8, wherein:
the moveable object comprises one or more rotatable joints;
the configuration of the moveable object comprises rotational information for the one or joints of the moveable object; and
the deformable object is a fabric that overlies the moveable object.

16. A non-transitory computer-readable medium containing instructions, which when executed by one or more processors, causes the one or more processors to perform a method comprising:
determining a configuration of a moveable object underlying a deformable object in a video game;
inputting, into a machine-learning model, input data comprising a representation of the configuration of the moveable object;
generating, as output of the machine-learning model, a model output including both a code for mesh data and a code for texture data for predicting an appearance of the deformable object;
determining, from the model output including both the code for the mesh data and the code for the texture data, the mesh and texture data for the deformable object; and
rendering the deformable object using the generated mesh and texture data.

17. The non-transitory computer-readable medium of claim 16, wherein determining the texture data for the deformable object comprises determining a normal map for the deformable object.

18. The non-transitory computer-readable medium of claim 17, wherein the model output comprises a code for a predicted normal map, wherein determining a normal map for the deformable object comprises performing a nearest-neighbour search on a normal map data store based on the code, and selecting a normal map for the deformable object based on a result of the nearest-neighbour search.

19. The non-transitory computer-readable medium of claim 16, wherein the model output comprises a code for a predicted mesh for the deformable object.

20. The non-transitory computer-readable medium of claim 16, wherein determining mesh data for the deformable object comprises generating a mesh by combining stored mesh basis vectors with the code for the predicted mesh.

* * * * *